United States Patent Office 3,639,373
Patented Feb. 1, 1972

3,639,373
DYEABLE POLYOLEFIN COMPOSITIONS
Orwin G. Maxson and Mack W. Hunt, Ponca City, Okla., assignors to Continental Oil Company, Ponca City, Okla.
No Drawing. Continuation-in-part of application Ser. No. 746,763, July 23, 1968. This application June 1, 1970, Ser. No. 42,547
Int. Cl. C08f 29/02
U.S. Cl. 260—93.7        13 Claims

ABSTRACT OF THE DISCLOSURE

Polyolefin compositions containing 0.5 to 20 weight percent of a metal sulfonate composition, which, preferably, is a 50:50 mixture of water-soluble metal sulfonate and oil-soluble metal alkaryl sulfonate. Also, improved method of dyeing polyolefins wherein the improvement comprises use of the metal sulfonate composition described in the foregoing. The polyolefin compositions described herein provide good color development on dyeing and retain their color when subjected to extraction with chlorinated dry cleaning solvents.

CROSS-REFERENCE TO RELATED APPLICATIONS

The present application is a continuation-in-part of application Ser. No. 746,763, filed July 23, 1968, now abandoned.

BACKGROUND

Much effort has recently been directed toward the development of synthetic fibers from the high molecular weight crystalline polymers of α-olefins, particularly propylene. It now appears that the use of crystalline polypropylene for this purpose is destined to be of considerable commercial importance because fibers of this polymer exhibit certain desirable properties which are not noteworthily associated with the other important synthetics such as the nylons, polyesters and acrylics. Substantial commercial utilization of polypropylene fibers in multifilament form, however, has been seriously hampered for lack of an acceptable method for piece-dyeing this product. In common with the previously developed synthetic fibers, polypropylene fibers are inherently difficult to dye. Needless to say, the technology for dyeing the various commercial synthetic fibers has for some time now advanced to a highly developed state and the problems faced initially in this regard have been solved. Unfortunately, this technology has hitherto been found to have very little practical applicability in the dyeing of polypropylene fibers.

We have successfully bridged this gap by devising a way for readily utilizing a commercially available class of fast dyes for piece-dyeing polypropylene fibers. The dyes suitable in the practice of this invention are the cationic, and sometimes referred to as basic dyes, conventionally employed in the dyeing of acrylic fibers. These dyes are structurally characterized in containing one or more basic nitrogen groupings. Beyond this, the knowledge of the chemical structure of these dyes is largely proprietary. As indicated, however, the dyes useful herein are commercial products and are known in the trade as acrylic dyes, meaning that they have been primarily developed and offered for universal application in the dyeing of acrylic based fibers. Exemplary commercial dyes of this type are described in the working examples to follow.

In U.S. Pat. No. 3,468,864, said patent having the same assignee as the present application, it is disclosed that poly-α-olefins such as polypropylene can be converted to a dyeable substance by the inclusion therein of a minor amount of an oil-soluble metal alkaryl sulfonate. Oil-soluble metal alkaryl sulfonates have very good miscibility with polyolefins and work effectively in enabling the polyolefin to be dyed. In addition, dyed polyolefin compositions containing oil-soluble metal alkaryl sulfonates are color-stable when washed with detergent-water. Unfortunately, these compositions lose some of their color by extraction when they are treated with chlorinated dry cleaning solvents. We have discovered that polyolefin compositions containing a mixture, preferably 50:50, of oil-soluble metal alkaryl sulfonate and water-soluble metal sulfonates have very good miscibility properties, develop good colors and are resistant to both water washing and chlorinated dry cleaning solvents.

It is believed that the metal sulfonate mixture behaves very much like the mordants employed in mordant dyeing. The mixture of sulfonate salts useful in the practice of this invention, unlike conventional mordants, is molecularly distributed throughout the polymer itself and thus, the usual step of applying the mordant is obviated. The sulfonate component besides furnishing a molecularly uniform distribution of dye sites also improves certain physical properties of the polymer, such as its ultimate tensile strength and elongation properties. Moreover, the sulfonate salt functions as a processing aid upon converting the polymer to fibers.

PRIOR ART

In addition to U.S. 3,468,864, discussed in the foregoing, the following U.S. patents were cited as references in the parent application: 3,207,725; 3,432,472; 3,438,955.

Briefly, none of the references cited, recognize that a combination of water-soluble metal sulfonates and oil-soluble metal sulfonate, when used as a dye-receptive agent in polyolefins, provide improved results.

BRIEF DESCRIPTION OF OUR INVENTION

Briefly described, our invention relates to poly α-olefin compositions containing an effective amount, in the range of from about 0.5 to about 20 weight percent, of a metal sulfonate composition which is a mixture of water-soluble metal hydrocarbyl sulfonate and oil-soluble metal alkaryl hydrocarbyl sulfonate.

In one aspect, our invention relates to an improved method of dyeing polyolefins with cationic dyes wherein the improvement comprises using the above-described polyolefin composition.

DETAILED DESCRIPTION

Suitable polyolefins for use in our invention are crystalline polymers derived from α-olefins containing from 3 to 6 carbons. Typical suitable α-olefins are propylene, butene-1, 3-methylbutene-1, and 4-methylpentene-1. Of these, propylene is preferred.

The salient feature of our invention is the use of a metal sulfonate composition containing from about 40 to about 60 weight percent water-soluble metal sulfonate and, correspondingly, from about 60 to about 40 weight percent oil-soluble metal alkaryl sulfonate. Preferably, the ratio of oil-soluble and water-soluble metal sulfonate is about 50:50, on a weight percent basis.

The terms "oil-soluble" and "water-soluble" are believed to be well-understood by those skilled in the sulfonate art. However, to avoid any ambiguity, as used herein, the term oil-soluble refers to metal salts of hydrocarbyl, preferably alkaryl, sulfonic acids having an average equivalent weight of 300 and above, preferably in the range of 300 to 780. The term water-soluble refers to metal salts of hydrocarbyl sulfonic acids having an average equivalent weight of below 300. It should be noted that the sulfonic acids used to prepare the oil-soluble and water-soluble metal sulfonates will have individual component sulfonic acids with an equivalent weight well above and below the average equivalent weight.

Preferably, both the oil-soluble and water-soluble metal sulfonates are prepared from sulfonic acids, which in turn are prepared by sulfonation of hydrocarbons having certain characteristics. It is customary in the sulfonate art to describe the sulfonate by the type of hydrocarbon used to prepare the sulfonic acid. Because of this the hydrocarbons used to prepare both the water-soluble and oil-soluble metal sulfonates will be described in detail.

Suitable water-soluble sulfonates for use in our invention include those prepared from sulfonic acids which are prepared from alkaryls, and from diphenylalkanes. Preferably the alkaryls are monoalkylaryls and more preferably are monoalkylbenzenes. An example of a suitable alkaryl is dodecylbenzene. Typically, this material is prepared by preparing a propylene tetramer and then alkylating benzene with the propylene tetramer. The resulting product contains alkyl groups having from 9 to 15 carbon atoms, with a predominance of $C_{12}$ alkyl groups. The term dodecylbenzene is so well understood in the sulfonate art that further description is not necessary.

Another suitable water-soluble sulfonate is prepared from a sulfonic acid which is prepared from an alkyl benzene prepared by alkylating benzene with a substantially straight-chain $C_8$–$C_{18}$ 1-olefin or an analogous chlorinated hydrocarbon. The preparation of a particularly suitable straight chain alkyl benzene is described in U.S. Pat. No. 3,316,294, which patent is made a part of this disclosure.

Briefly, the process of U.S. 3,316,294 comprises the following steps, broadly stated:

(a) Separating a fraction of substantially straight-chain $C_8$–$C_{18}$ hydrocarbons from a petroleum distillate substantially free of olefins and containing said straight-chain hydrocarbons together with non-straight chain hydrocarbons, (b) Chlorinating said fraction to the extent whereby between about 10 and about 35 mole percent of the straight-chain hydrocarbons present are substantially only monochlorinated, (c) Alkylating an aromatic compound (e.g. and preferably, benzene) with the chlorination product of step (b) in the presence of an alkylation catalyst and, (d) Distilling the alkylate to obtain the desired detergent alkylate fraction.

A product prepared by the foregoing process is available under the trademark "Nalkylene" 500 and has the following typical physical properties:

| | |
|---|---:|
| Average molecular weight | 238 |
| Specific gravity, 60° F. | 0.859 |
| Bromine number | 0.1 |
| Pour Point, ° F. Below | −70 |
| C.O.C. Flash Point, ° F. | 310 |
| C.O.C. Fire Point, ° F. | 330 |
| Distillation data, ° F. (ASTM D–447) | |
| IBP | 540 |
| 5% | 550 |
| 50% | 562 |
| 95% | 588 |

This material is referred to as "N–500" in the examples.

Still another suitable water-soluble sulfonate is prepared from a sulfonic acid which is prepared from a diphenylalkane fraction, which is a by-product of the alkylbenzene prepared in accordance with the procedure of U.S. Pat. No. 3,316,294. The sulfonic acid prepared from diphenylalkane is represented by the following formula:

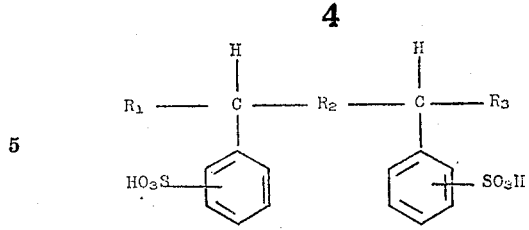

wherein $R_1$ and $R_3$ are alkyl groups containing from 1 to 15 carbon atoms and $R_2$ is an alkyl group containing from 1 to 14 carbon atoms, with the sum of $R_1$, $R_2$ and $R_3$ being an integer in the range of 6 to 16.

Suitable oil-soluble sulfonates for use in our invention include both those prepared from mahogany sulfonic acids and synthetic alkaryl sulfonic acids, preferably the latter. The mahogany sulfonic acids are a complex mixture of aromatic and alicyclic sulfonic acids produced in the conventional sulfuric acid refining of lubricating oil distillates. The industrial production of mahogany sulfonic acid is well known in the art and such products are readily available commercial items.

A suitable synthetic alkaryl sulfonic acid for preparing the oil-soluble metal alkaryl sulfonates is prepared from postdodecylbenzene which is well known in the sulfonate art. Postdodecylbenzene is a bottoms product from the manufacture of dodecylbenzene, and, preferably, has a molecular weight in the range of from about 370 to about 700.* It consists of monoalkylbenzenes and dialkylbenzes, the alkyl groups being branched-chain, in the approximate mole ratio of 2:3. It has the following typical properties:

| | |
|---|---:|
| Specific gravity at 38° C. | 0.8649 |
| Average molecular weight | 385 |
| Percent sulfonatable | 88 |
| A.S.T.M. D–158 Engler: | |
| I.B.P., ° F. | 647 |
| 5° F. | 682 |
| 50° F. | 715 |
| 90° F. | 760 |
| 95° F. | 775 |
| F.B.P. ° F. | 779 |
| Refractive index at 23° C. | 1.4900 |
| Viscosity at: | |
| −10° C., centipoises | 2800 |
| 20° C., centipoises | 280 |
| 40° C., centipoises | 78 |
| 80° C., centipoises | 18 |
| Aniline point, ° C., | 69 |
| Pour point, ° F. | −25 |

Another suitable synthetic alkaryl sulfonic acid for preparing the oil-soluble metal alkaryl sulfonates is prepared from the bottoms product obtained in the production of water-soluble detergent alkylate in accordance with the process of U.S. Pat. No. 3,316,294. The bottoms product is referred to as "NAB Bottoms" and is a complex mixture of monoalkylbenzenes, dialkylbenzenes, alkylated tetrahydronaphthalenes, and diphenylalkanes. Stripping removes the major portion of the diphenylalkanes, so that the stripped bottoms is a mixture of monoalkylbenzenes, dialkylbenzenes and alkylated tetrahydronaphthalenes, with the alkylated tetrahydronaphthalenes being only a minor amount (e.g. from about 15 to about 30 weight percent). This product is described in more detail in application Ser. No. 529,284, filed Feb. 23, 1966 and having the same assignee as the present application, said application being made a part of this disclosure.

Still another suitable alkaryl sulfonic acid for preparing the oil-soluble metal alkaryl sulfonates is prepared

---

*A sulfonic acid prepared from dodecylbenzene having an average molecular weight of about 700 would have an average equivalent weight of about 780.

from the product obtained by disproportionating an n-alkyl benzene in the presence of a Friedel-Crafts catalyst. This product is predominantly di-n-alkylbenzenes in which the alkyl groups are predominantly oriented in the para position. Preferably, the average molecular weight of this class of alkylate is between about 400 and 425.

The preparation of these di-n-alkylbenzenes is described more completely in application Ser. No. 529,284, referred to in the foregoing.

Yet another suitable alkaryl sulfonic acid for preparing the oil-soluble metal alkaryl sulfonates is prepared from a material which is referred to as "dimer alkylate." In contrast to the "NAB Bottoms," described hereinbefore, "dimer alkylate" is predominantly monoalkyl aromatic, with the alkyl group being branched and, preferably, highly branched. Furthermore, the alkyl group contains at least 17 carbon atoms, preferably more than 17 carbon atoms. Preferably, the aromatic moiety is phenyl. The "dimer alkylate" has the following properties:

| Property | Suitable | More suitable | Preferred |
|---|---|---|---|
| Percent monoalkyl content* | Above 50 | Above 70 | Above 90. |
| Molecular weight (average) | Above 320 | Above 350 | 375–478. |
| Boiling range,° F., at 20 mm. Hg. | Above 325 | Above 375 | Above 400. |
| Sulfonation yield lb. RSO$_3$H/lb. alkylate. | Above 0.75 | Above 0.85 | Above 0.95. |

*This is based on mole percent of total aromatic constituents.

A particularly suitable method of preparing "dimer alkylate" comprises the following steps:

(a) dimerization of a suitable feedstock, such as cat poly gasoline,
(b) alkylation of an aromatic hydrocarbon, preferably benzene, with the dimer formed in step (a).

Preferably, the dimerization step uses a Friedel-Crafts alkylation sludge as the catalyst. This process and the "dimer alkylate" product are described in U.S. Pat. No. 3,410,925, said patent being made a part of this disclosure.

Knowing the type of hydrocarbons used to prepare the metal sulfonates of our invention any person skilled in this art can readily prepare a sulfonic acid from the hydrocarbon and then convert the sulfonic acid to the desired metal sulfonate. An exemplary method for preparing the metal salts of the sulfonic acids described herein can be found described in U.S. Pat. No. 3,277,002. Moreover, a detailed description of the preparation of the metal sulfonates is provided in the examples.

Usually, the oil-soluble sulfonic acids contain a substantial amount of free oil. While this is not harmful when these acids are to be converted to lube oil additives it is not desirable in a fiber-forming polyolefin composition. For this reason, it is desirable to de-oil the commercially available oil-soluble sulfonic acid or sulfonate if the content of free oil exceeds about 10%. This can be achieved by washing the sulfonate with a polar solvent to provide a sulfonate enriched phase from which the sulfonate in a more concentrated form can be recovered readily.

The color of the oil-soluble sulfonates which are marketed primarily for use as lube oil additives is usually very dark. It is, therefore, a practical requisite that the oil-soluble sulfonate employed as a modifier in fiber-forming polyolefins in accordance with this invention be treated so as to improve the color thereof. A variety of purification methods exist for decolorizing the oil-soluble sulfonic acids or sulfonates. For example, in one purification method the oil-soluble sulfonic acid is treated with charcoal or clay prior to neutralization. In another method, the oil-soluble sulfonic acid is extracted with a lower alcohol (e.g. methanol) followed by neutralization. As a matter of fact, it is possible to produce amber-colored sulfonate salts from any of the oil-soluble sulfonic acids described herein. In the absence of such treatment these products range in color from medium brown to a deep mahogany.

The preferred metals for preparing the salts of the sulfonic acids are those in Groups I–A, II–A, II–B, and III–A of the Periodic Table. Especially preferred metals are lithium, magnesium, calcium and zinc. An unusual characteristic of zinc is that it results in a sulfonate salt which exhibits better color than the sulfonic acid used in the preparation of the salt.

The amount of the metal sulfonate composition (including both oil-soluble and water-soluble sulfonates) that can be incorporated into the polymer for the purpose of providing uniformly distributed dye sites ranges from about 0.5 to 20% based on a combined weight of the sulfonate and polyolefin. The preferred range of sulfonate salt in the composition of this invention is from about 1 to 10% on the aforesaid basis. The metal sulfonate salts can be uniformly incorporated into the polyolefin by compounding polyolefin in a molten state with the salt in a suitable mixing device such as a Banbury mill.

The metal sulfonate mixture can be prepared by blending the desired oil-soluble and water-soluble sulfonates. Alternatively, the desired hydrocarbon sulfonation feedstocks can be blended and then sulfonated concurrently.

The procedure of dyeing substrates prepared from the compositions of this invention follows the conventionally observed practices in this art. In piece dyeing multi-filaments, the fibers are first scoured and then run into a dye bath containing a small amount of the water-soluble dye, usually not in excess of about 3%, at a moderately elevated temperature in the order of about 140° F. Thereafter, the temperature of the dye bath is slowly raised to a boil and boiling continued for an hour to two hours. The dyed material is rinsed and scoured at about 160° F., rinsed again and then dried.

While our invention has special utility in connection with the dyeing of fiber-forming polyolefins in multi-filament form, its usefulness is not limited to such an application nor to the specific type of polymers prevalently utilized therein. For example, both the low and high density polyethylenes as well as copolymers of a major amount of ethylene and a minor amount of other α-olefins, vinyl or vinylidene monomers find widespread use in production of free films. Such substrates can be uniformly and permanently dyed in accordance with this invention. Also the aftermentioned free films can be printed by suitably contacting the surface thereof with an ink whose prime coloring constituent is a cationic dye of the type hereinbefore described.

In order to illustrate to those skilled in the art a manner for implementing the inventive concept presented herein, the following working examples are set forth. As indicated, these examples are given primarily by way of illustration and accordingly, any enumeration of detail contained therein not embraced in the appended claims is not to be interpreted as a limitation on the invention.

EXAMPLES

In these examples a free film of a crystalline polyolefin was the selected type of substrate for illustrating the invention. The use of a substrate of this type, because of its readily measurable light transmission property, permits demonstrating the excellent dyeability characteristics of our novel composition in objective terms.

The crystalline polyolefin employed in these examples was a commercially available general purpose molding grade of polypropylene. The metal sulfonate compositions tested herein were incorporated into the polypropylene by mixing these components in a laboratory Banbury mixer. The nature of the sulfonate compositions which were incorporated into the polypropylene will be described in detail hereinbelow. In all of the examples the amount of sulfonate composition was 5% by weight. After suitably mixing in order to obtain complete dispersion of the sulfonate compositions within the composition, same was then compression molded to provide films of from 5–10 mils in thickness.

Free films of the polypropylene-sulfonate composition were dyed observing a conventional dyeing procedure. In all of the examples described herein the dye was Nabor Brillant Red 4 G [1] (available from Allied Chemical Company). The procedure consisted of first scouring the test film sample at about 140° F. and thereupon boiling the sample in a dye bath consisting of an aqueous solution of about 0.4% of the dye based on the weight of the film sample. Following dyeing, the films were rinsed and then dried. The intensity of each dyed sample was measured as percent light transmission employing a standard reflectance meter for this purpose.

The color resistance of the dyed films to chlorinated dry cleaning solvents was determined as follows. A small piece of the dyed film was placed in a small bottle containing 150 ml. of "Perclene" [2] or "Triclene." [2] The bottle was capped and tumbled for one-half hour in a 50° C. water bath. Thereupon the dyed film was removed from the bottle and the light transmission value was measured.

The oil-soluble metal sulfonates were prepared as follows. First the sulfonic acid was prepared using the following procedure:

The hydrocarbon and three volumes of hexane, per volume of hydrocarbon, were added to a suitable reaction vessel. The admixture was stirred vigorously while adding 0.75 volume of oleum, per volume of hydrocarbon, slowly in order that the reaction temperature did not exceed 45° C. Upon completion of the addition of the oleum the reaction mass was mixed for one hour and then placed in a separatory funnel, where it remained overnight. The sludge acid phase was removed and the crude hexane-sulfonic acid phase was added to another vessel. The inorganic acids were removed by treating the crude mixture with calcium hydroxide followed by filtration to remove the inorganic calcium salts.

The magnesium salts of the sulfonic acids were prepared using the following general procedure:

To a suitable vessel were added the sulfonic acid and an equal quantity of alcohol (isopropanol, methanol or methoxy ethanol). The sulfonic acid was then neutralized by the addition of a stoichiometric quantity of magnesium alcoholate (magnesium methanolate or magnesium methoxy ethanolate). After the neutralization, a major portion of the solvent was removed by distillation to a bottoms temperature of 110–120° C. The mixture was then transferred to a vacuum oven and the remaining solvent removed at 100–110° C. under house vacuum.

The zinc salts of the sulfonic acids were prepared by a similar procedure using zinc oxide instead of the alcoholate.

The water-soluble metal sulfonates and the mixtures of oil-soluble and water-soluble metal sulfonates were prepared using the following procedure:

The desired hydrocarbon or mixture of hydrocarbons was added to a suitable reaction vessel. While stirring the hydrocarbon vigorously 1.2 volumes of oleum, per volume of hydrocarbon, was added in a manner that the temperature of the reaction mass did not exceed 55° C. After the addition of the oleum, the sulfonation mass was mixed for one hour at 50–55° C. Then 0.7 volume of water, per volume of hydrocarbon, was added to the sulfonation mass while maintaining the temperature at 55° C. or less. The resulting admixture was placed in a 50° C. oven overnight for phase separation. The inorgance acid phase was removed leaving the desired sulfonic acid.

[1] This is a polymethine dye produced by a Fischer's base synthesis. This synthesis is described in the book "The Chemistry of Synthetic Dyes and Pigments" by H. A. Lubs, 1955 (Reinhold Publishing Corp., New York, N.Y.), p. 250.
[2] Dry cleaning composition containing perchloroethylene, or trichloroethylene available from E. I. du Pont de Nemours and Co., Inc.

The water-soluble metal sulfonates or mixture of water-soluble and oil-soluble metal sulfonates were prepared from the sulfonic acids using the procedure described for the preparation of the metal salts of the oil-soluble sulfonic acids.

For purposes of illustrating our invention the results of tests on polypropylene compositions containing magnesium sulfonates prepared from the following hydrocarbons, using the procedures described immediately hereinbefore, are shown below.

(A) 50% diphenylalkane + 50% stripped "NAB Bottoms"
(B) 50% "N–500" + 50% "NAB Bottoms"
(C) 50% diphenylalkane + 50% "dimer alkylate"
(D) 50% diphenylalkane + 50% di-n-alkylbenzenes prepared by disproportionation of mono-n-alkylbenzenes For purposes of comparison with the above the results of tests on polypropylene compositions containing either magnesium* or zinc* sulfonates prepared from the following hydrocarbons, using the procedures described hereinbefore, are also shown below:

(E) 100% stripped "NAB Bottoms"
(F) 100% diphenylalkanes
(G) 100% di-n-alkylbenzes prepared by disproportionation of mono-n-alkybenzenes.—zinc salt
(H) 75% di-n-alkylbenzenes (same as above) + 25% diphenylalkanes.

The table below shows the results of compatability color density and chlorinated solvent extraction on the compositions described in the foregoing.

| Sulfonate composition | Compatability | Color density* | Resistance to chlorinated solvents |
|---|---|---|---|
| A | Good | High | Good. |
| B | do | Excellent | Excellent. |
| C | do | High | Fair. |
| D | do | do | Do. |
| E | do | Medium | Poor. |
| F | Poor | Light | Good. |
| G | Good | Medium | Poor. |
| H | Fair | do | Fair. |

*While relative ratings are shown, they are based on measured light transmission readings.

A study of the above-shown data indicated readily that polypropylene containing sulfonate compositions A through D rated fair to excellent in all of the desired properties. By contrast polypropylene containing sulfonate compositions E through G had a "poor" rating in at least one of the desired properties. Polypropylene containing sulfonate composition H (75% oil-soluble; 25% water-soluble) had properties which could be considered borderline. Polypropylene containing sulfonate composition B (50% "N–500"+50% "NAB Bottoms") had the best overall properties and is the preferred composition of our invention.

The results of dyed polypropylene compositions containing no sulfonate are not shown since U.S. Pat. No. 3,468,864, referred to in the foregoing, contains such results.

While particular embodiments of the invention have been described, it will be understood, of course, that the invention is not limited thereto, since many modifications fall within the true spirit and scope of the invention.

The invention having thus been described, what is claimed and desired to be secured by Letters Patent is:

1. A new composition of matter comprising from about 80 to about 99.5 weight percent crystalline poly α-olefin, said poly α-olefin being prepared from α-olefins containing from 3 to 6 carbon atoms, and from about 0.5 to about 20 weight percent of a metal sulfonate composition containing from about 40 to about 60 weight percent water-soluble hydrocarbyl metal sulfonate and from about 40 to about 60 weight percent oil-soluble metal alkaryl

*Magnesium except where indicated.

sulfonate, wherein the term water-soluble hydrocarbyl metal sulfonate refers to metal salts of hydrocarbyl sulfonic acids having an average equivalent weight of below 300, the term oil-soluble alkaryl metal sulfonate refers to metal salts of alkaryl sulfonic acids having an average equivalent weight of 300 to 780 and the term metal refers to those materials in Groups I–A, II–A, II–B, and III–A of the Periodic Table.

2. The composition of claim 1 wherein the poly α-olefin is polypropylene.

3. The composition of claim 1 wherein the poly α-olefin is poly 4-methyl pentene-1.

4. The composition of claim 2 wherein the metal is zinc.

5. The composition of claim 2 wherein the metal is magnesium.

6. The composition of claim 2 wherein the metal is lithium.

7. The composition of claim 2 wherein the oil-soluble metal sulfonate is a di-n-alkylbenzene sulfonate.

8. The composition of claim 7 wherein the water-soluble metal alkaryl sulfonate is a mono-n-alkylbenzene sulfonate.

9. The composition of claim 7 wherein the water-soluble metal sulfonate is a diphenylalkane sulfonate.

10. The composition of claim 8 wherein the metal is magnesium.

11. The composition of claim 8 wherein the metal is zinc.

12. The composition of claim 9 wherein the metal is magnesium.

13. The composition of claim 9 wherein the metal is zinc.

References Cited

UNITED STATES PATENTS

| | | | |
|---|---|---|---|
| 3,207,725 | 9/1965 | Pfeifer | 260—45.7 |
| 3,277,002 | 10/1966 | Hunt et al. | 252—32.7 |
| 3,316,294 | 4/1967 | Feighner et al. | 260—505 |
| 3,410,926 | 11/1968 | Eby et al. | 260—683.15 |
| 3,432,472 | 3/1969 | Caldwell | 260—75 |
| 3,438,955 | 4/1969 | Rombusch et al. | 260—93.7 |
| 3,468,864 | 9/1969 | Maxson et al. | 260—93.7 |

JOSEPH L. SCHOFER, Primary Examiner

S. M. LEVIN, Assistant Examiner

U.S. Cl. X.R.

260—80.78, 88.2 S, 94.9 GD